United States Patent
Branscomb

Patent Number: 5,977,992
Date of Patent: *Nov. 2, 1999

[54] APPARATUS AND METHOD FOR ASSEMBLING CONTENT ADDRESSABLE VIDEO

[75] Inventor: Hill Branscomb, San Francisco, Calif.

[73] Assignee: Advanced Interaction, Inc., San Francisco, Calif.

[*] Notice: This patent is subject to a terminal disclaimer.

[21] Appl. No.: 08/925,828

[22] Filed: Sep. 5, 1997

Related U.S. Application Data

[63] Continuation of application No. 08/243,046, May 16, 1994, Pat. No. 5,684,514, which is a continuation of application No. 08/146,400, Nov. 1, 1993, abandoned, which is a continuation-in-part of application No. 08/000,927, Jan. 6, 1993, abandoned, which is a continuation-in-part of application No. 07/460,849, Dec. 8, 1989, abandoned.

[51] Int. Cl.⁶ .................................................. G09G 5/00
[52] U.S. Cl. ....................... 345/507; 345/145; 345/157
[58] Field of Search ................................ 345/185, 189, 345/145, 156, 157, 507

[56] References Cited

U.S. PATENT DOCUMENTS

| | | | |
|---|---|---|---|
| 4,600,919 | 7/1986 | Stern | 340/725 |
| 4,857,902 | 8/1989 | Naimark et al. | 358/103 |
| 4,942,539 | 7/1990 | McGee et al. | 358/181 |
| 4,992,866 | 2/1991 | Morgan | 358/108 |

*Primary Examiner*—Matthew Luu
*Attorney, Agent, or Firm*—Mark A. Haynes; Haynes & Beffel LLP

[57] ABSTRACT

A system and method for assembling or generating content addressable video based on storing a plurality of frames of video data at addressable storage locations. Each frame of video data is stored with a tag which indicates the contents of the video image defined by the associated frame. For assembly, a processing unit assembles a content video image in response to the tags; the content video image, including positions for corresponding frames of video data. Finally, a means, such as a look up table, is provided for associating the positions in the content video image with addresses of storage location storing the corresponding frames of video data. A user input device is provided by which the user selects a particular frame of video data, by selecting a position in the content video image, such as by positioning a cursor on the selected position.

For generating content addressable video, the content video image is first generated. Positions in the content video image are then translated by a control circuit into camera positioning signals. A controllable camera, such as a robot mounted camera, then generates the frames of video in response to the position control signals derived from the content video image. A processing unit then associates each frame of video data generated by the controllable camera, with positions in the content video image.

2 Claims, 5 Drawing Sheets

Content Image With Graphic Space

Cm - - - ( * * * ) - - - - - - Cm#7 - - - - - - - - - Cm7 - - - - - - - - - - - - - - - F9
Are we really happy with this lonely game we play ? . . .

Cm - - - - - - - - - - - - - A - - b7 - - G7 - - - - Cm - - - - - - - - - - - - - - - - - - Cm#7
Looking for words to say . . . searching but not finding

- - - - - - Cm7 - - - - - - - - - - - F9
understanding anyway . .

FIG. 6

APPARATUS AND METHOD FOR ASSEMBLING CONTENT ADDRESSABLE VIDEO

The present application is a continuation of application Ser. No. 08/243,046, filed May 16, 1994, U.S. Pat. No. 5,684,514; which is a continuation of application Ser. No. 08/146,400, filed Nov. 1, 1993, now abandoned, which is a continuation in part of application Ser. No. 08/000,927, filed Jan. 6, 1993, now abandoned, which is a continuation in part of application Ser. No. 07/460,849, filed Dec. 8, 1989, now abandoned.

CROSS REFERENCE TO RELATED APPLICATIONS

The present application is related to U.S. Pat. No. 4,857,902, entitled POSITION-DEPENDENT INTERACTIVITY SYSTEM FOR IMAGE DISPLAY, invented by Naimark, et al., issued Aug. 15, 1989; and to U.S. patent application Ser. No. 07/356,543, entitled CONTENT ADDRESSABLE VIDEO SYSTEM FOR IMAGE DISPLAY, filed May 24, 1989.

FIELD OF THE INVENTION

The present invention relates to systems for generating and storing video frames of information, such as produced using video/film cameras. In particular, the present invention provides a method and an apparatus for assembling frames of video data so that it may be accessed in response to the content of the respective frames.

BACKGROUND OF THE INVENTION

Interactive video systems, such as described in the above cross referenced U.S. Pat. No. 4,857,902, in which a first monitor displays a virtual space which indicates the content of a library of video frames, and a second monitor displays video frames, in response to the position of a cursor on the virtual space, provide a powerful system for accessing video frames based on the content of the video frames. The content is indicated by the virtual space. To access video based on content, a user moves a cursor to a position on the virtual space. In response to the position of the cursor on the virtual space, a video frame is accessed which has a content indicated by the position of the cursor.

A problem has arisen in compiling video frames for the purposes of addressing them by content for use in such systems. In particular, the video frames are generated in such systems based on a plan organized by a human producer. The film is then shot, such as by flying a helicopter on a geographic grid while filming a center point of reference. For instance, in the one system, a helicopter flew over the Golden Gate Bridge in San Francisco, while focusing the camera on the center of the bridge.

Once the film has been generated, it must be manually compiled into sequences of video frames which correspond to the grid flown over the city. The grid is then drawn in a bit map graphic form for display as the virtual space. A correlation of the virtual space to the video frames is done manually in a time-consuming, tedious process.

It is desirable to provide a method for compiling or generating content addressable video automatically.

SUMMARY OF THE INVENTION

The present invention provides an apparatus and method for assembling content addressable video which is based on storing a plurality of frames of video data at addressable storage locations. Each frame of video data is stored with a tag which indicates the contents of the video image defined by the associated frame. A processing unit, assembles a content video image in response to the tags, including positions in the content image for corresponding frames of video data. Finally, a means, such as a look-up table, is provided for associating the positions in the content video image with addresses of storage locations storing the corresponding frames of video data. A user input device is provided by which the user selects a particular frame of video data by selecting a position in the content video image, such as by positioning a cursor on the selected position.

The assembly of the content video image can be understood by considering the following example. If a plurality of frames of video data comprise film of a geographic area, each frame can be tagged with a position stamp, indicating the position of the camera when it was taken, and the focal point of the camera. This position stamp can then be translated automatically to a virtual position on a map. The map superimposed with the virtual positions of all the video frames in the plurality then constitutes the content video image. This content video image can be displayed using a bit map graphic system, in which a cursor can be positioned on any position in the content video image. The position of the cursor is then translated into the position stamp of the frame of video data, and from the position stamp, into an address for the frame.

According to another aspect, the present invention comprises an apparatus or method for generating content addressable video, which is the converse of assembling the content addressable video. In particular, according to this aspect, the content video image is first generated. Positions in the content video image are then translated by a control circuit into camera positioning signals. A controllable camera, such as a robot mounted camera, then generates the frames of video in response to the position control signals derived from the content video image. A processing unit then associates each frame of video data generated by the controllable camera, with positions in the content video image.

The generation of content addressable video according to this aspect of the invention can be understood by considering the following example. Assume that one wanted to generate a content addressable video-library of an object, such as the transmission of an automobile. A content video image would then be graphically created in which an icon representing the transmission is placed in a virtual graphic space. A grid, three dimensional, or two dimensional, is then drafted using computer software graphics packages, to create a grid indicating the perspective of the transmission to be filmed. Thus, each position in the grid would correspond to a frame of video data depicting a different perspective of the transmission.

A cursor is then scanned along the grid, either manually or using automatic computer programs, and cursor position is then translated into a camera control signal. The camera, mounted on a robot, then traverses real space corresponding to the virtual space of the content video image in response to the control signals, while filming the transmission. A processing unit then associates a position tag with each frame of video, and correlates the position tag with a position in the content video image.

According to the invention, a user input device is provided, by which a user selects a particular frame of video by positioning a cursor on the content video image. This allows for highly interactive video systems in which frames of video data are addressed by content in an easily understandable and fun to use manner.

Other aspects and advantages of the invention can be seen upon review of the drawings, the detailed description, and the claims which follow.

DETAILED DESCRIPTION

A detailed description of preferred embodiments of the present invention is described with reference to the figures.

Figure 1:
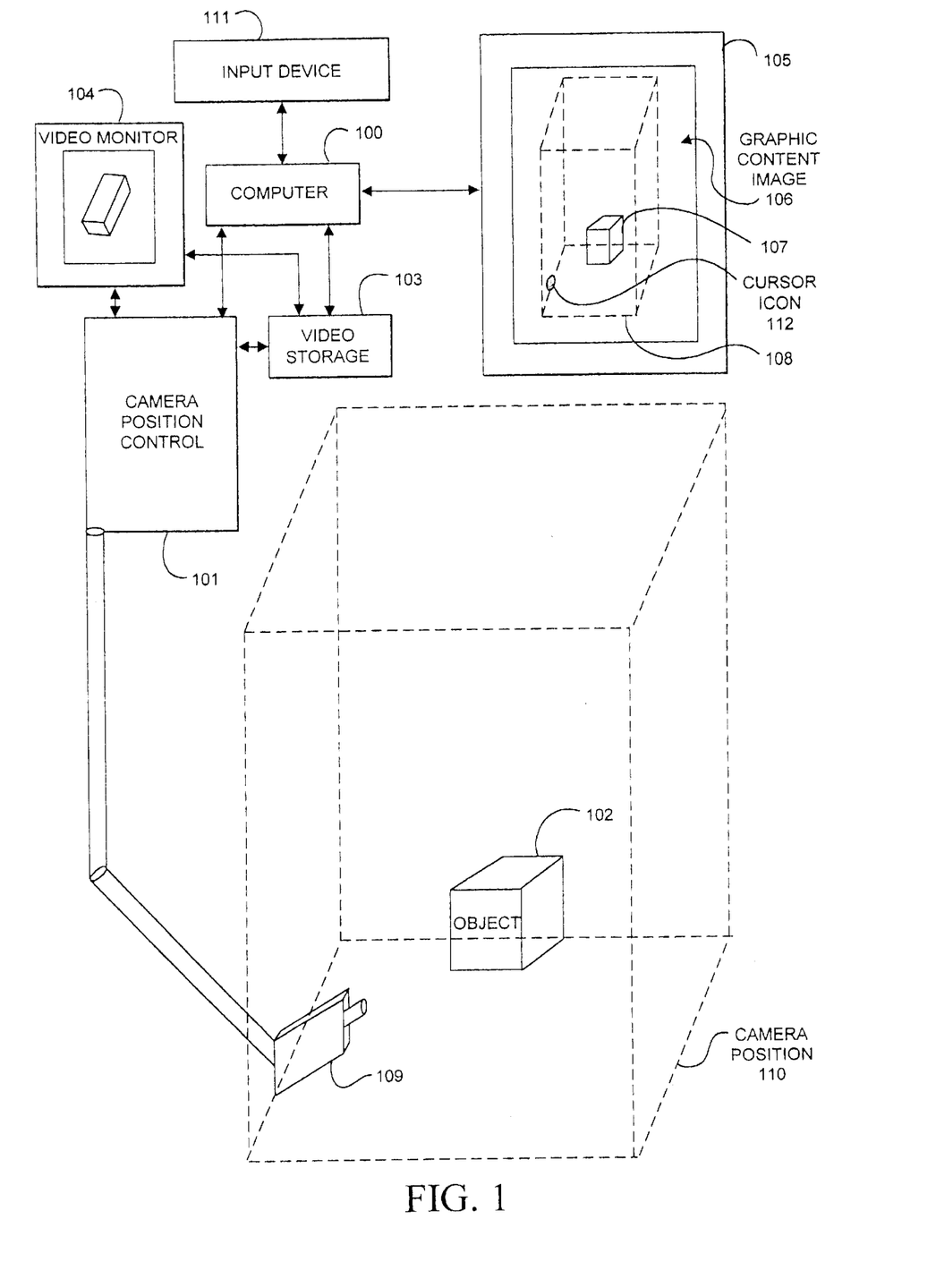
FIG. 1 is a schematic diagram of a system for generating, or assembling content addressable video according to the present invention.

In FIG. 1, a system for assembling or generating content addressable video is illustrated. The system includes a computer 100 which provides processing capability used in assembling or generating the video. A computer is coupled to a camera position control robot 101 or other mechanism for controlling the position of a camera. The camera position is controlled to generate a plurality of frames of video information of an object 102 in a space. Video frames are then stored in video storage 103. A video monitor 104 is provided for displaying the video frames as they are being filmed, or for accessing the video storage 103 to review the film. A content monitor 105 is provided which includes a graphic film content image 106. The film content image includes a depiction 107 of the object to be filmed, and a grid 108 having a plurality of positions. Positions on the grid 108 indicate the content of corresponding video frames in the video storage. Thus, as the camera position control robot 101 moves the camera 109 along a plurality of camera positions indicated by the grid 110, the computer assigns a key to each frame of video. This key is correlated with a position in the graphic film content image 106 along the grid 108.

A user input device 111, such as a mouse or track ball in the preferred system, can be used to position a cursor icon 112 along the grid 108 in the graphic film content image 106. Thus, the position of the cursor icon 112 indicates the content of a frame of video being displayed on the video monitor 104. Therefore, for the object 102 being filmed from camera position as indicated at 109, and as represented by the cursor icon 112 on the content image 106, an image would be displayed in the video monitor 104, which shows the bottom, left side, and front of the object 102, as schematically illustrated in FIG. 1.

The system can be expanded to include a plurality of cameras for filming a specific object, such as an automobile transmission. Also, the object 102 can be moved instead of the camera to generate the frames of video.

The content image 106 can be generated before filming the object 102, and thereby used to generate camera position control signals to control the generation of video. Similarly, the film can be shot first, and keys associated with each frame of video. The keys can then be analyzed by the computer 100 in order to generate a content image 106. This content image 106 can be generated at the same time that the camera is being used to film the object, or it can be generated on an as needed basis from a huge library of video frames.

Thus, the system of FIG. 1 can be generalized by providing cameras attached to control arms that can move within a confined space. A virtual map or content image of frame content is mapped in a graphic image displayed on a content monitor. Control of the cameras, and their movements and point of view, are functions of positioning of camera icons or cursors in the graphic content image.

Figure 2:
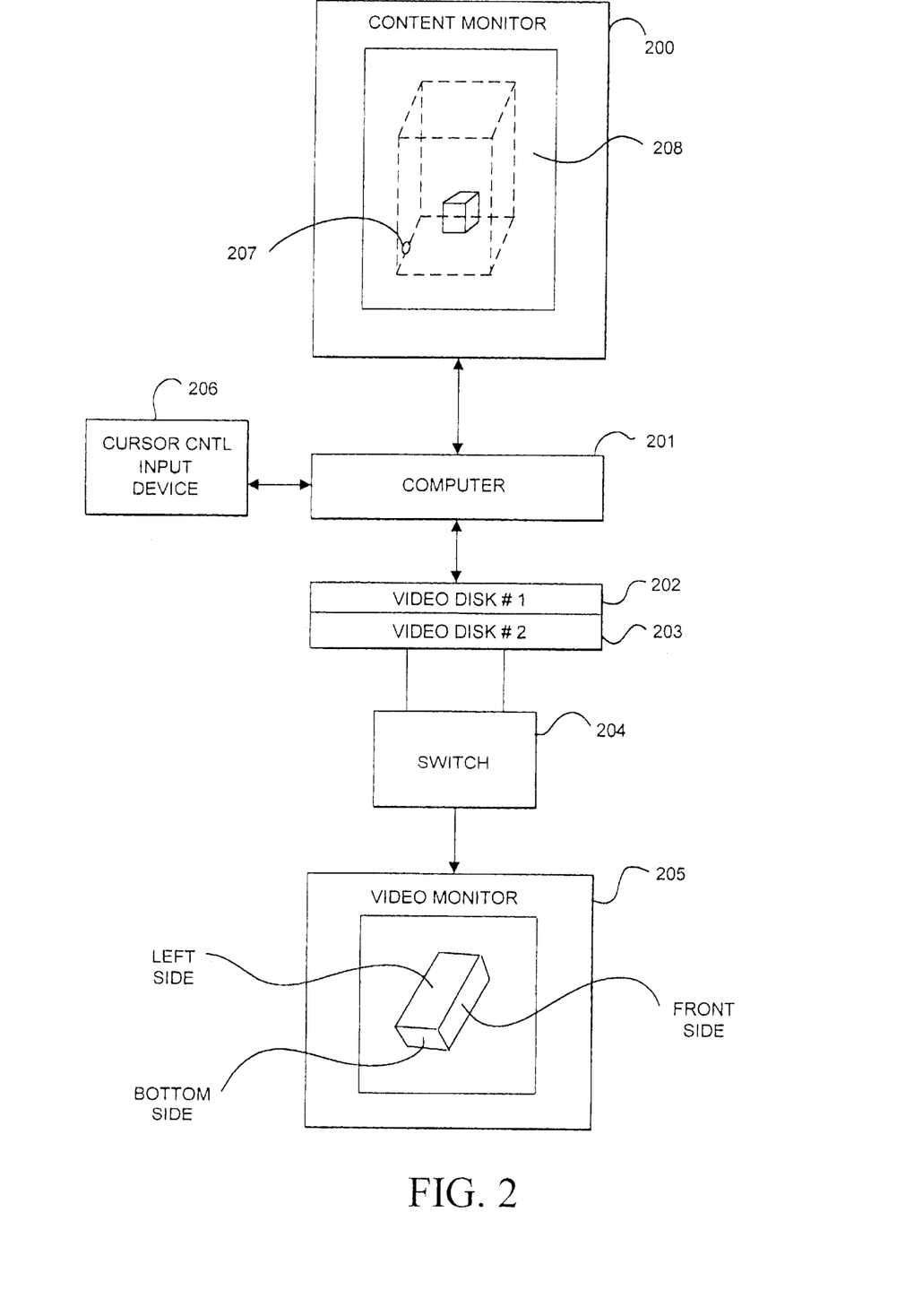
FIG. 2 is a schematic diagram of a system for interactively displaying content addressable video according to the present invention.

FIG. 2 illustrates the preferred system for displaying the content addressable video according to the present invention. In this system, a content monitor 200 is provided which is connected to the computer 201. Two video disk players 202 and 203 store a plurality of video frames. A video switcher 204 which is controlled by computer 201 selects output video from the video disks in the players 202 and 203. The output video supplied to video monitor 205. A cursor control input device 206, like a mouse or track ball in the preferred system, is coupled to the computer 201. A user interactively positions the cursor 207 within the content video image 208 on the content monitor 200. A perspective of the object is displayed on the video monitor 205 which is indicated by the position of the cursor 207 in the content image 208. Thus, for the virtual space content image 208 illustrated in FIG. 2, a frame corresponding to the position of cursor 207, will provide a view of the object illustrated in the content image 208, which shows the bottom side, left side, and front side, as schematically illustrated in FIG. 2.

Background concerning how to implement these interactive display systems can be found in the above cross-referenced U.S. Pat. No. 4,857,902.

Figure 3:
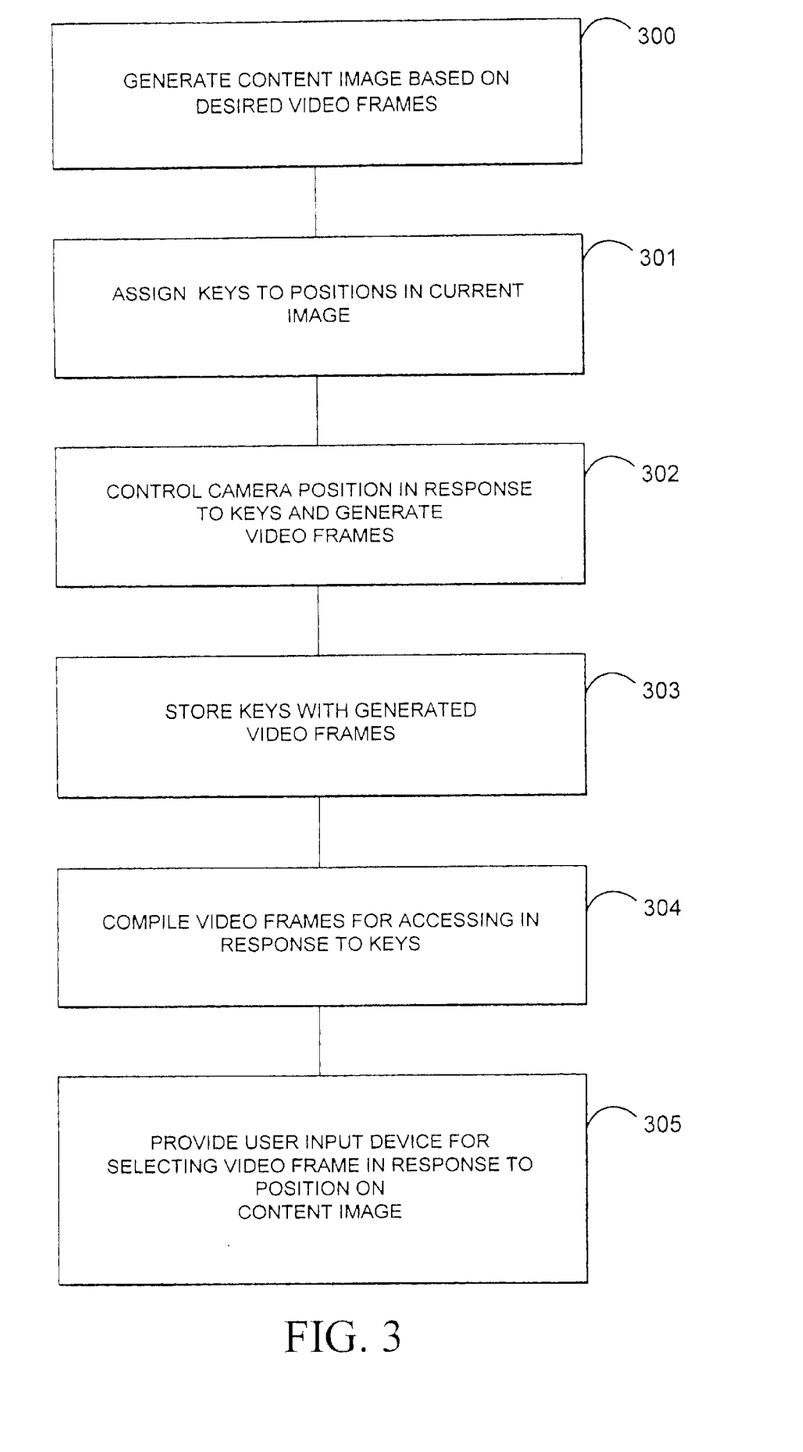
FIG. 3 is a flow chart illustrating steps in a method for generating content addressable video according to the present invention.

FIG. 3 illustrates the flow chart for the method using the apparatus of FIG. 1, or similar apparatus, to generate content addressable video. According to this method, a user uses a computer software graphics package or other tools to generate a content image based on desired video frames to be generated (block 300).

Next, the computer 100 is used to assign keys to positions in the content image. For the content image illustrated in FIG. 1, these keys would correspond to the X, Y, and Z positions on the grid 108 (block 301).

Next, the keys are used by the computer 100 to generate camera position control signals which control the robot to film the object in response to the keys (block 302). Next, the keys are stored with or otherwise associated with each generated video image (block 303). The video frames are then compiled in a format which facilitates accessing in response to the keys (block 304). The step of compiling involves assigning the video frames to addresses in the video storage, and providing a means for translating the keys to the address of the corresponding video frame. These are standard computer techniques which can be based on look up tables and the like. Also, this compiling step involves identifying the frames of video on intersecting segments of the grid 108 and storing them on video disks, or other storage means, in storage positions which are accessible within a seek time at least as fast as the update rate of the video monitor. In the preferred system, this is at least 15 times per second.

Finally, a user input device is provided for selecting a video frame in response to a position on the content image (block 305). Again, this is provided by positioning a cursor on the content image using an input device. The position of the cursor then identifies a key which can be translated to an address of the corresponding video frame. Using the address, the video frame is accessed and displayed.

Therefore, the content of the video frames is used to access them in a straightforward, highly interactive manner. Furthermore, this content image is used to automatically control the generation of the video frames to be accessed in this content addressable video scheme.

Figure 4:
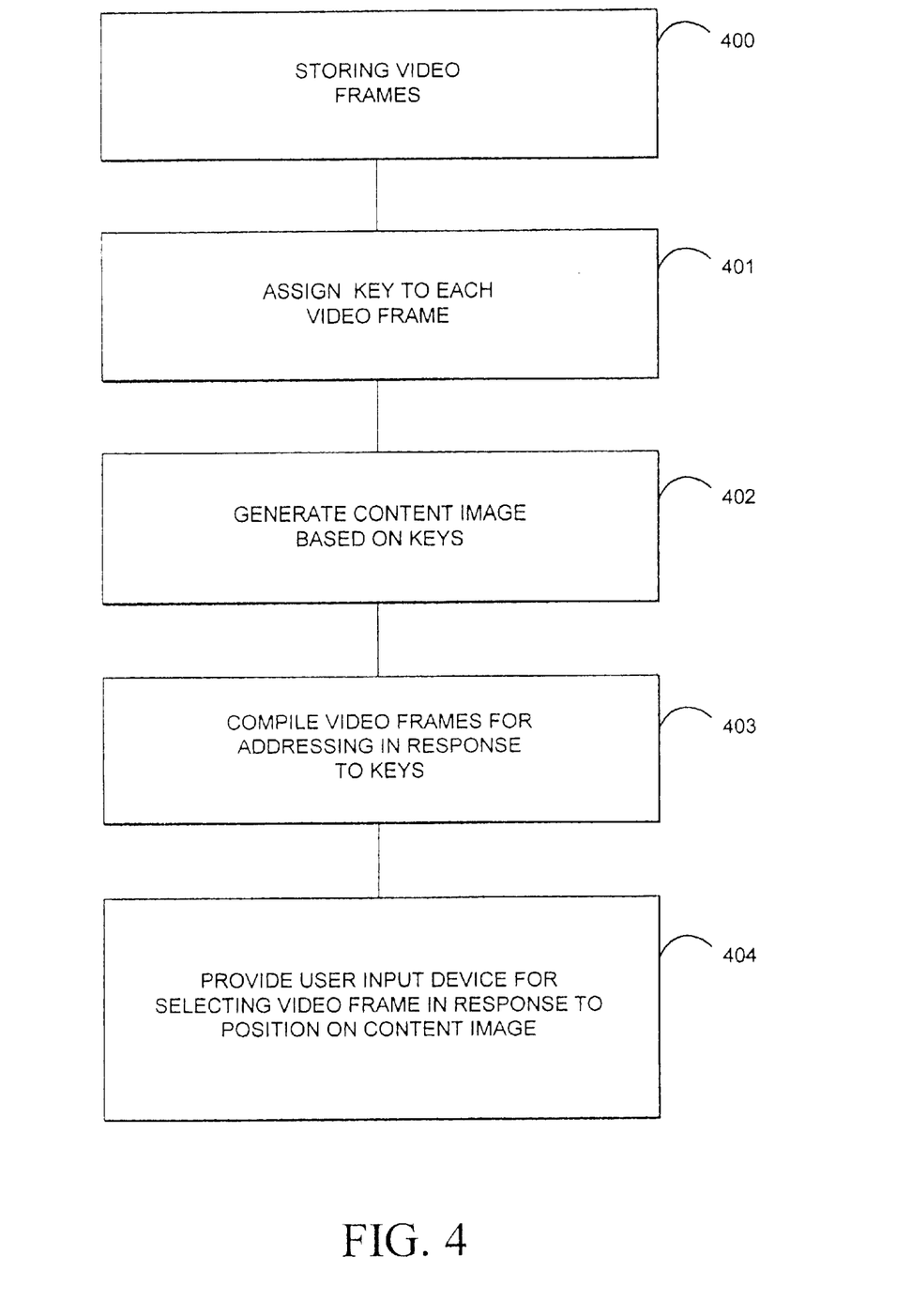
FIG. 4 is a flow chart illustrating the steps in a method for assembling content addressable video according to the present invention.

FIG. 4 is a flow chart illustrating the steps used for assembling content addressable video from a large library of video frames.

This method involves first storing a library of video frames (block 400). Such video frames may, for instance, correspond to film of a highway system.

Next, a key is assigned to video frames or segments of frames that are stored. These keys may correspond to geographic position stamps of the location filmed in the corresponding video frames (block 401). These keys can be calculated using interpolation techniques in which a sequence of video along a given highway, having a known start point and stop point can be assigned keys based on the estimated position of each frame.

The next step involves generating a content image based on the assigned keys (block 402). According to this method, the assigned keys are used to compile a map using bit map graphics or the like, in which each key has a corresponding position on the map. This content image can be generated for a subset of the entire library video frames, which consists of a few video frames or of the entire library.

The next step involves compiling the video frames for addressing in response to the assigned key (block 403). The generated content image is used to compile the video frames by identifying positions on the content image of adjacent keys, and storing the video frames at addresses indicated by the keys. For a large library of frames, a subset of the library which corresponds to at least a section of the content image is moved into a storage buffer that has reasonable access times, such as a writable optical disc or array of RAM.

Finally, a user input device is provided for selecting a video frame in response to a position on the content image (block 404). Having assembled a subset of the video frames by generating a content image representative of the content of the subset, a user can use a highly powerful interactive scheme for positioning a cursor on the content image to select the particular video frame having the desired content.

The basic tools and methodology for the assembly of content addressable video systems are very similar for the various data acquisition methods. The process involves the marriage between a graphic space, acquired visual data and the relational content image of this visual data in the graphic space. In the system there exist at least an element of organization, i.e., a physical location of visual data and its respective position in a graphic space (content image). This organization is critical to the representation of information and serves as the base methodology for a visual language. Content Addressable Video systems may be built from closed systems, controlled camera environments, and uncontrolled or free camera environments. They may be built from a combination of all three.

A. CLOSED SYSTEM ENVIRONMENT

A closed system implies a graphic or artificial environment. An example of such a system is a CAD workstation which has tools for designing objects as well as for the three dimensional animation of these objects frame by frame into a movie. Software provides the producer the capability to build the content image into the graphic space. The tools for drawing a content image already exist in CAD systems.

Once the content image is constructed, a light is projected from a cursor which represents the focal plane of the camera. A joystick controls the direction of the camera (cursor or camera icon) while the cursor traverses the content image in preview mode. This provides for accurate pan, tilt keys as well as accurate position data. Once the operator decides this content image and camera point of view are correct, he implements an "animate" command and each frame is rendered, stored and finally compiled for interactive control. Hence, a system as described in FIG. 2 with the CAD and animation tools with the content addressable image software technology.

The key stamps consist of position, pan, and tilt with their respective video frame derived directly from their location in the graphic virtual space.

This module provides segments or geometric shapes to be recognized by the camera paths. These shapes may be drawn with the normal draw routines. The program will ask for the frame density along the paths and the camera POV. The line segments will parse frame locations along the line segments and send keys out to a frame database and then calculate the frame by frame animation. The frames are stored to optical discs or other memory, such as large 3-D arrays of DRAMs or VRAMs, accessed in a massively parallel means, and the content image is assembled. The matrix arrangements are compiled and a cursor appears on the content image in the graphic space once the compilation and assembly is complete providing control to the user.

B. CONTROLLED CAMERA ENVIRONMENT

In this method of data acquisition, the visual data is acquired in controlled filming environments; specifically those where cameras are controlled in stationary or motion controlled environments. The assembly of these content addressable video systems will require predefined matrices of film maps generated on a graphic computer platform which translates actual commands to a camera motion control platform for videomap production and automated assembly. In this environment, the space which the cameras can cover are scaled to the virtual graphic space such that an incremental movement of a cursor on a content image solicits a relative movement of the camera (or video once shot and compiled) in its respective space.

In our system, we will place the subject, say an automobile transmission, on the platform.

The algorithm works as follows:
1. Scale Camera Locations in real space to camera locations in the graphic content image space. Also zero out camera pan, tilt and direction POV. Position subject in content image space.
2. Locate graphic model center at x, y, z in graphic virtual space on motion platform.
3. Build the content image in the graphic space using the graphic software tool commands. Or build sequence in real space using actual cameras. The actual camera moves are recorded, stamped, and converted to the graphic space.
4. Stamp keys on frames (or other recording methods discussed below) by recording camera position, POV, Pan, and Tilt in real time while recording frames.

5. Record filmed frames to optical disc player or to other archive technology.
6. Convert camera position stamp locations to content image scale and location. Store key data locations of camera in the content image space frame by frame. Location data consist of x, y, z location, Pan, Tilt, and focal plane.
7. Store locations of frames in content image space (x, y, z) relationship of each frame to its corresponding content image in a graphic space using keys and the system's processing unit.
8. Sort and determine the visual matrix as well as relationship of each frame to its corresponding content image in a graphic space using keys and the system's processing unit.
9. Compile database in its matrix structure.
10. Generate content image space in virtual space.
11. Choose starting point in matrix.
12. Compile and organize frame data and reference content image space relative to virtual space.

Camera System

The way it works is as follows:

Cameras are attached on control arms and can move anywhere in one virtual space. A content image is drawn in response to the camera movement or by hand in the graphic virtual space (computer screen) such that an incremental move or matrix location in the camera space is equal to the incremental vector in the graphic space. In other words, from picture to picture the video matrix corresponds to its content image in its graphic space.

C. UNCONTROLLED (FREE) CAMERA ENVIRONMENT

The third data acquisition environment deals with data acquired in uncontrolled filming environments. This acquisition requires accurate position information and Pan (P), Tilt (T) as frame stamping as keys for content image assembly. These video matrices are assembled into accurate survey mapping systems as well as other GIS systems for display and overlay capability.

Figure 5:
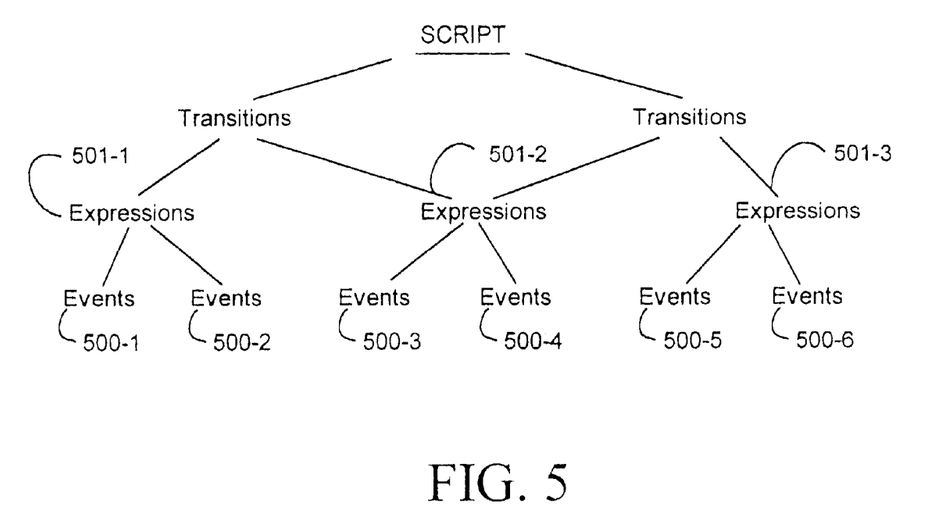
FIG. 5 is a diagram of the assembly algorithm module for an uncontrolled camera environment.

FIG. 5 is a diagram as to the modules of the code in the assembly algorithm. This system integrates an uncontrolled platform (free) or other film systems for videomap production. There is no limit placed upon the size of matrices. This may require multiple stores of optical discs. In this case, the database structure requires an additional data location stamps for archive purposes.

Aerial or Free Camera Systems

In the case of free filming camera systems, (i.e., cameras in helicopters, balloons, Remote Piloted Vehicles, etc.) a final post processing step must be implemented to compile accurate relationships between the content image space and its relative virtual space. The method of scripting of content addressable video systems provide for a combination of free-form data acquisition and tight grid or matrix data acquisition.

The following additional aspects to this workstation are important for flying or developing videomaps for uncontrolled spaces.

1. Camera speed should be directly controlled to provide an accurate matrix when using a free virtual filming system such as a helicopter, balloon, ground gyrostabilized camera mount such as a steadycam etc. This provides compensation for environmental effects of wind and other factors which affect camera position.
2. Actual location of the camera is determined by updates of camera location, pan, tilt axis on a frame by frame basis. This information is processed back to the navigational controls of the camera platform (including helicopter) in order to provide corrections and adjustments in direction location and POV.
3. The system is designed with a predetermined content image structure prior to recording video or film. This content image structure produces a navigational data set for the camera. This navigational information incorporates supporting flying surfaces such as those used to guide the flying machine.

Design of an Aerial Videomap

The design requires a map system which contains actual spatial elements of the area which is to be mapped. Since the current filming system is by helicopter and much of the data acquisition is implemented by sight flying with some GPS navigation aid. A remote powered vehicle drone is utilized for "close-in" mapping.

Position Stamping

The current method of frame location in video is a standard called SEMPTE Time Code. Its structure is as follows: Hour, Minutes, Seconds, Frames In the preferred embodiment, this code is expanded into the following structure:

Hour, Minutes, Seconds, Frames, Earth Reference Fixed GPS Receive Position, x, y, z, position GPS (Time T), Camera Receiver Position x, y, z GPS, Velocity (Time T), Acceleration Time (T), Corrected Compass Camera Mount Facing (Time T), Pan degree (Time T), Tilt (Time T), Rotation (Time T), Frame Number and the content image scale to the graphic space (map).

The sample rate of the data will be controlled by the camera frame rate or speeds which determine frame accurate stamping. As frames are shot, they will be written to the nearest sample. Current GPS data is available on one second intervals but may change given satellite positioning and reception quality. Post processing is currently necessary to average distance between GPS position samples, distance covered and number of frames per second. Thus, location stamping requires post processing in this situation. The satellite locations are scrambled and also have to be post processed.

The on-board filming system is designed to send data to a counter and then to the data accumulator per frame of video or film. If film is used, each reel will have its own position database. The position stamps are included with each individual frame. Currently, production technology provides a standard way of adding SEMPTE time code to video. Position stamping according to the present invention may follow the same standard methodology.

Methods of Storing Stamps and Prescribed Data Keys Are:

1. Actual time stamping and a comparison algorithm of camera location at time (T) and frame exposure time (T).
2. Writing actual time and position data on sound track of video.
3. Use of computer memory for storing frame exposure time and position simultaneously.

Trimble Navigation provides the Trimble Advanced Navigation Sensor System for GPS. Our system will use this technology or some other GPS system which is designed to triangulate satellite signals for position. A second ground station receiver will also be used to improve accuracy and the data collected and merged with the data received (sample rate) in the aircraft and processed to refine error rates and improve position accuracy to an area of 5 meters cube or better.

Another system is currently being designed which utilizes a mirror system on a drone PRV and a laser. The laser is directed at the PRV and a receiver whose position is accurately surveyed, processes the laser band reflection and samples actual RPV location for real time positioning. This system and position stamp per frame will be similar, however, it will provide very accurate positioning.

A software routine will build a system of frame location in the three dimensional virtual space based upon the following organization.

Content Addressable Video Assembly

The following treatment of the software tools which may be used to develop a prescribed sequence of routes and camera position which when implemented will provide an autopilot control, camera position (pan and tilt) and frame controlled for the data acquisition hence the tools for an assembly language.

The elements of this system are:

1. Accurate maps of prescribed videomap area.

The U.S. Geological Survey (USGS) has accurate mapping maps in vector form of many areas which have been processed by satellite. The design of a videomap begins with this information in a workstation. It is not essential to have this information for the design because the data acquisition position stamping will provide the information necessary to merge this information into these map databases at a later date. However, all productions begin with a script or plan based upon a desired application and the sequences of visual material which best fit the application. Obviously, there are many accurate methods of obtaining pictures of the ground; they include SPOT Satellite, Space Shuttle picture systems and high reconnaissance aircraft. A Moviemap or Videomap of these pictures and their translation into continuous imagery via a continuum of connected images in 25 FPS or 30 FPS or some visual translation from frame to frame in a raster frame merger is another option and used in a closed system.

Videomap Production

As mentioned above, the beginning design requires some element of production scripting and design. The GPS system will also be designed as a pilot aid for navigation. The designer begins by using the Content Addressable Video workstation to design his production, that is, the content image to scale in the prescribed graphic space. A location cursor in the aircraft in conjunction with the GPS hardware and a two dimensional map with the actual routes to scale will provide the pilot an on-board navigation system. This is integrated with the autopilot. Though a good quality structure improves the overhead processing requirements and delta graphic overlay displays it is not essential to get it exact. However, it is important to know precisely the position of what was recorded. Pilots are very capable of flying VFR and instruments accurately with navigational assistance.

D. DATA ACQUISITION AND ASSEMBLY OF A CONTENT ADDRESSABLE VIDEO SYSTEM

The assembly techniques can be used in a variety of contexts. For example, an automatic assembly routine can be used for teaching music. In the music example: One might film someone playing a song on a piano (hands only). The script of the song may be broken down to sound and visual entities of frames of each depression of the keys. Each chord and the associated frames would be an event. The assembly of two chords together would be an expression of events, the multiple expression of events would result in the script.

So the fundamental logic or algorithms behind the Content Addresssable Video System are driven and organized in this example by this fundamental structure.

This example assumes a database of extensive events and a logical form of transition. It is essential to include a distinction between the actual tools of organization and assembly of data and the creative elements which provide a transition continuity to the data.

A database must have a multiplicity of creative transitional elements. Current post production equipment has so many "hacks" to handle a lack of these transitional elements. A leading film maker established the use of "special transition effects" as transitional elements. Hitchcock was a master of the study of transitional elements.

An interactive movie must contain events. These events must be expressed. The interactive dimension is established through creative transitional elements as illustrated in FIG. 5.

Let's design an interactive piano and then assemble a song using this method.

I. Develop the database for the Script
   A. Define the number of events 500-1 through 500-6. These events are all chords in the music spectrum.
   B. Create the music for each event and store the sound data chord (E - time).
   C. Develop transitions between Events. Film expressions (e.g., 501-1 through 501-3) of all combinations of two events. That is, all of the independent physical hand movements from chord event to chord event.
II. Write the script A. "This Masquerade" c1973 Teddy Jack
   Cm        Cm#7        Cm7        F9
"Are we really happy with this lonely game we play? . . .
   Cm        Ab7        G7 Cm        Cm#7
Looking for words to say, . . . searching but not finding
   Cm7        F9
understanding anyway."

Figure 6:
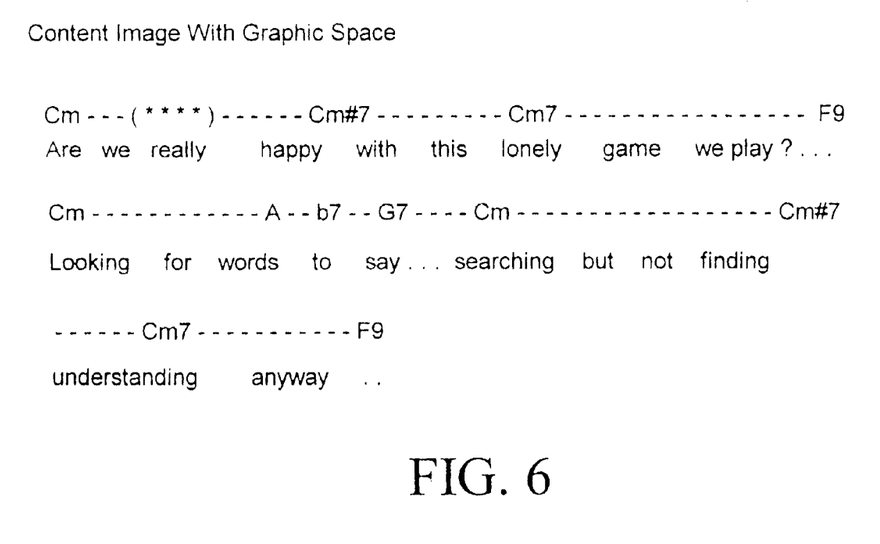
FIG. 6 is a diagram illustrating the development of the database for writing the script of a song.

B. List Events—(Underlines indicate location of events.) There are 11 events proposed in this song. They are:
   E1- Cm
   E2- Cm #7
   E3- Cm7
   E4- F9
   E5- Cm
   E6- A b7
   E7- G7
   E8- Cm
   E9- Cm #7
   E10- Cm7
   E11- F9
III. Now implement the automated assembly function.
End result for preview is illustrated in FIG. 6.
First frame of hands in the Cm playing position El. System prepared to cue first Expression E1-E2 (Cm-Cm#7) transition is the hand movement from Cm to Cm#7. Interactive control with cursor (***)
Sound Data and Relational Data Location
Sound of Cm chord based upon movement of location cursor Content Addressable Video System Process (Automated Procedure) Step 1 The first step involves storing video frames as in block 400 of FIG. 4. The store of video frames will be stored in a database as set out in Table I, entitled Database Frame Location below. As can be seen in the Table I, frames are stored in sequences which consist of an expression which proceeds from note Cm to note Cm#7, corresponding to a transition from event E1 to event E2. This consists of frames 1–420. Each of the 10 expressions in the database are stored.

In the next step, a key is assigned to each video frame corresponding to block 401 of FIG. 4. This is done by searching the database frame location database for the events E1 through E11. According to this step, a table such as Table III, entitled Record Database, set out below is computed. Thus, the first entry in the Table I corresponds to the first entry in Table III. The first event E1 is in original frames 0–60. The transition from E1 to E2 is in original frames 60–360, and the second event stored in frames 360–420. This sequence is divided so that new frame numbers 0–220 are stored with a key identifying them as transition E1 to E2.

In the next step, a content image as shown in FIG. 6 is generated based on the keys. This content image is generated by signing each key a position on the content image as shown on Table II below. Thus, event E1 will be assigned X,Y position (0,160) on the XY scale. Table II also shows the number of frames between each event on the display.

The final step, the video frames are compiled for addressing in response to the key corresponding to block 403 of FIG. 4. This step of compiling video frames results in an assembled database as shown below In Table IV. A given frame, e.g. frame 0 is compiled so it can be accessed in response to position (0,160) on the frame. In this embodiment, a sequence of frames is displayed in response to a user selecting the position which range from frame 0–220 as shown in Table II. In a more simple case as described above, only a single frame may be displayed in response to positioning of the cursor.

Once the content image of FIG. 6 is displayed and the assembled database of Table IV is computed, a user input devise may be used for accessing specific frames in response to a position on the content image as described with reference to block 404 of FIG. 4.

These processing steps are thus executed by the processor 201 of FIG. 2 and interconnected by the databases and tables computed by the processing steps.

Search database for E1–E11 Expressions

TABLE I

Database Frame Location (arbitrary for this example)

| | Expression | Event Frames | Transition Frames | Event Frames |
|---|---|---|---|---|
| 1. | Cm to Cm#7 | 1–60 | 60–360 | 360–420 |
| 2. | Cm#7 to Cm7 | 1500–1560 | 1560–1860 | 1860–1920 |
| 3. | Cm7 to F9 | 2100–2160 | 2160–2460 | 2460–2520 |
| 4. | F9 to Cm | 3000–3060 | 3060–3360 | 3360–3420 |
| 5. | Cm to A b7 | 3500–3560 | 3560–3860 | 3860–3920 |
| 6. | A b7 to G7 | 4000–4060 | 4060–4360 | 4360–4420 |
| 7. | G7 to Cm | 5000–5060 | 5060–5360 | 5360–5420 |
| 8. | Cm to Cm#7 | 6000–6060 | 6060–6360 | 6360–6420 |
| 9. | Cm#7 to Cm7 | 7000–7060 | 7060–7360 | 7360–7420 |
| 10. | Cm7 to F9 | 8000–8060 | 8060–8360 | 8630–8420 |

In this example, the:

Event Time (t) is 60 frames or 2 seconds

Transition (t) is 300 frames or 10 seconds

Expression (t) is 360 or 12 seconds.

Determine location of all underlines in x, y screen coordinates of content image. In this case, the words designate the map distance between events. In this example, the differential of the x, y coordinates between events provides the transition scale for the expressions. Total line length x=160. The special coordinates of the content image are defined below in Table II.

TABLE II

| | x | y | Dx | Dy (line map) | # Frames |
|---|---|---|---|---|---|
| E1 | 0 | 160 | 0 | | |
| E2 | 60 | 160 | 60 | 0 | 50/160(300) = 94 |
| E3 | 80 | 160 | 20 | 0 | 30/160(300) = 56 |
| E4 | 140 | 160 | 80 | 0 | 80/160(300) = 150 |
| E5 | 0 | 130 | 30 | 0 | 30/160(300) = 56 |
| E6 | 60 | 130 | 60 | 0 | 60/160(300) = 112 |
| E7 | 70 | 130 | 10 | 0 | 10/160(300) = 150 |
| E8 | 80 | 130 | 10 | 0 | 10/160(300) = 19 |
| E9 | 160 | 130 | 80 | 0 | 80/160(300) = 150 |
| E10 | 30 | 100 | 30 | 0 | 30/160(300) = 56 |
| E11 | 80 | 100 | 50 | 0 | 50/160(300) = 94 |

TABLE III

Record Database

| | Event | Transition- | Skip Frames | Event | Recorded New Frame # |
|---|---|---|---|---|---|
| E1–E2 | 0–60 | 60–360 | 3 | 360–420 | 0–220 |
| E2–E3 | 1500–1560 | 1560–1860 | 5 | 1860–1920 | 221–400 |
| E3–E4 | 2100–2160 | 2160–2460 | 1 | 2460–2520 | 401–670 |
| E4–E5 | 3000–3060 | 3060–3360 | 5 | 3360–3420 | 671–850 |
| E5–E6 | 3500–3560 | 3560–3860 | 3 | 3860–3920 | 851–1070 |
| E6–E7 | 4000–4060 | 4060–4360 | 1 | 4360–4420 | 1071–1340 |
| E7–E8 | 5000–5060 | 5060–5360 | 15 | 5360–5420 | 1341–1480 |
| E8–E9 | 6000–6060 | 6060–6360 | 1 | 6360–6420 | 1481–1750 |
| E9–E10 | 7000–7060 | 7060–7360 | 5 | 7360–7420 | 1751–1930 |
| E10–E11 | 8000–8060 | 8060–8360 | 3 | 8360–8420 | 1931–2150 |

TABLE IV

Assembled Database

| Node | Num Nodes | Node | Num Frame | Num Node | Frame | X, Y | Audio |
|---|---|---|---|---|---|---|---|
| 1 | 1 | 2 | 0 | | | 0, 160 | Cm |
| 2 | 2 | 1 | 220 | 3 | 220 | 60, 160 | Cm#7 |
| 3 | 2 | 2 | 400 | 4 | 400 | 80, 160 | Cm7 |
| 4 | 2 | 3 | 670 | 5 | 670 | 140, 160 | F9 |
| 5 | 2 | 4 | 850 | 6 | 850 | 0, 130 | Cm |
| 6 | 2 | 5 | 1070 | 7 | 1070 | 60, 130 | Ab7 |
| 7 | 2 | 6 | 1340 | 8 | 1340 | 70, 130 | G7 |
| 8 | 2 | 7 | 1480 | 9 | 1480 | 80, 130 | Cm |
| 9 | 2 | 8 | 1750 | 10 | 1750 | 160, 130 | C#7 |
| 10 | 2 | 9 | 1930 | 11 | 1930 | 30, 100 | Cm7 |
| 11 | 1 | 10 | 2150 | | | 80, 130 | Fb |

In Table IV, the first column corresponds to a given node, e.g. node E1 in the database. The second column identifies the number of nodes that are associated with the node in column 1. The third column identifies one of the adjacent nodes. The fourth column identifies the number of the frame associated with the first adjacent node identified in column 3. The fifth column identifies a second adjacent node, if any. The sixth column identifies the frame number associated with the second adjacent node. The seventh column identifies the X, Y coordinates on the content image of the node of column 1. The eighth column identifies the audio which is to be produced in association with the node in column 1.

E. MATRIX ASSEMBLY ALGORITHMS

1. Beginning, End, or flaw in frame data algorithm

Key stamps of the video data are read and stored into a key database. This is particularly useful and essential for the assembly of the video frame matrix. A number of algorithms may be processed during the read and store function from tape to the key database, including the following two important components:

1. Relational Frame Matrix Algorithm

This process studies each frame and their keys to determine their matrix locations. This process establishes common frames, nodes, and the spatial relationships for the content image and its relational virtual space.

2. Image Recognition Key

During the process of recording from tape to key database an algorithm is used to study the differential in pixel change from frame to frame in real time. A key is stored when the differential is large enough from frame to frame to locate a flaw or edit or cut between sequences. This will aid in reaffirming the relational frame matrix algorithm.

SUMMARY

This technology automates the organization and assembly of video frame data such that the acquisition, assembly, and ultimate integration of images may be represented in a relational graphic space via a content image. These systems' real time capability are a function of speed memory and memory burst rate and the platform will effect the performance. The display format of these large stores of archived image data, content images files and relational graphic spaces form a powerful interactive visual display language.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for generating content addressable video, comprising:

displaying a content video image representative of an organization of content addressable video, the content video image having positions within the content video image corresponding to desired content of video images to be displayed;

selecting with data processing resources positions within the content video image;

executing program steps with data processing resources which generate control signals indicating a content for a video image in response to the selected positions within the content video image;

generating video data in response to the control signals, the video data defining one or more video images having the content indicated by the control signals; and executing program steps with data processing resources which associates the video images in the video data with positions in the content video image.

2. An apparatus for generating content addressable video, comprising:

a content image display which displays a content video image representative of an organization of content addressable video, the content video image having positions within the content video image corresponding to desired content of video images to be displayed;

a controller, in communication with the content image display, which generates control signals indicating content for video images in response to respective positions within the content video image; and controllable image generator, responsive to the control signals, which produces video images in response to video image data indicated by the control signals corresponding to respective positions in the content video image.

* * * * *

UNITED STATES PATENT AND TRADEMARK OFFICE
CERTIFICATE OF CORRECTION

PATENT NO. : 5,977,992  
DATED : November 2, 1999  
INVENTOR(S) : Hill Branscomb Page 1 of 1

It is certified that error appears in the above-identified patent and that said Letters Patent is hereby corrected as shown below:

<u>Title page,</u>  
Item [63], Related U.S. Application Data, should read:  
-- Continuation of Application No. 08/243,046, May 16, 1994, Pat. No. 5,684,514, which is a continuation of application No. 08/146,400, Nov. 1,1993, abandoned, which is a continuation-in-part of application No. 08/000,927, Jan. 6, 1993, abandoned, which is a continuation-in-part of application No. 07/640,489, Jan. 11, 1991, abandoned. --.

Signed and Sealed this

Sixteenth Day of May, 2006

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 5,977,992 | Page 1 of 1 |
| APPLICATION NO. | : 08/925828 | |
| DATED | : November 2, 1999 | |
| INVENTOR(S) | : Hill Branscomb | |

It is certified that error appears in the above-identified patent and that said Letters Patent is hereby corrected as shown below:

<u>Title page,</u>
Item [63], Related U.S. Application Data, should read:
-- Continuation of Application No. 08/243,046, May 16, 1994, Pat. No. 5,684,514, which is a continuation of application No. 08/146,400, Nov. 1,1993, abandoned, which is a continuation of application No. 08/000,927, Jan. 6, 1993, abandoned, which is a continuation-in-part of application No. 07/640,489, Jan. 11, 1991, abandoned. --.

Column 1, lines 5-12 should read:

-- The present application is a continuation of application Ser. No. 08/243,046, filed May 16, 1994, now U.S. Pat. No. 5,684,514, which is a continuation of application Ser. No. 08/146,400, filed Nov. 1, 1993, now abandoned, which is a continuation of application Ser. No. 08/000,927, filed Jan. 6, 1993, now abandoned, which is a continuation in part of application Ser. No. 07/640,489, filed Jan. 11, 1991, now abandoned. --

This certificate supersedes the Certificate of Correction issued May 16, 2006.

Signed and Sealed this

First Day of July, 2008

JON W. DUDAS
*Director of the United States Patent and Trademark Office*